June 1, 1926.                            1,587,379
A. HALLUM
TETHER
Filed August 11, 1924
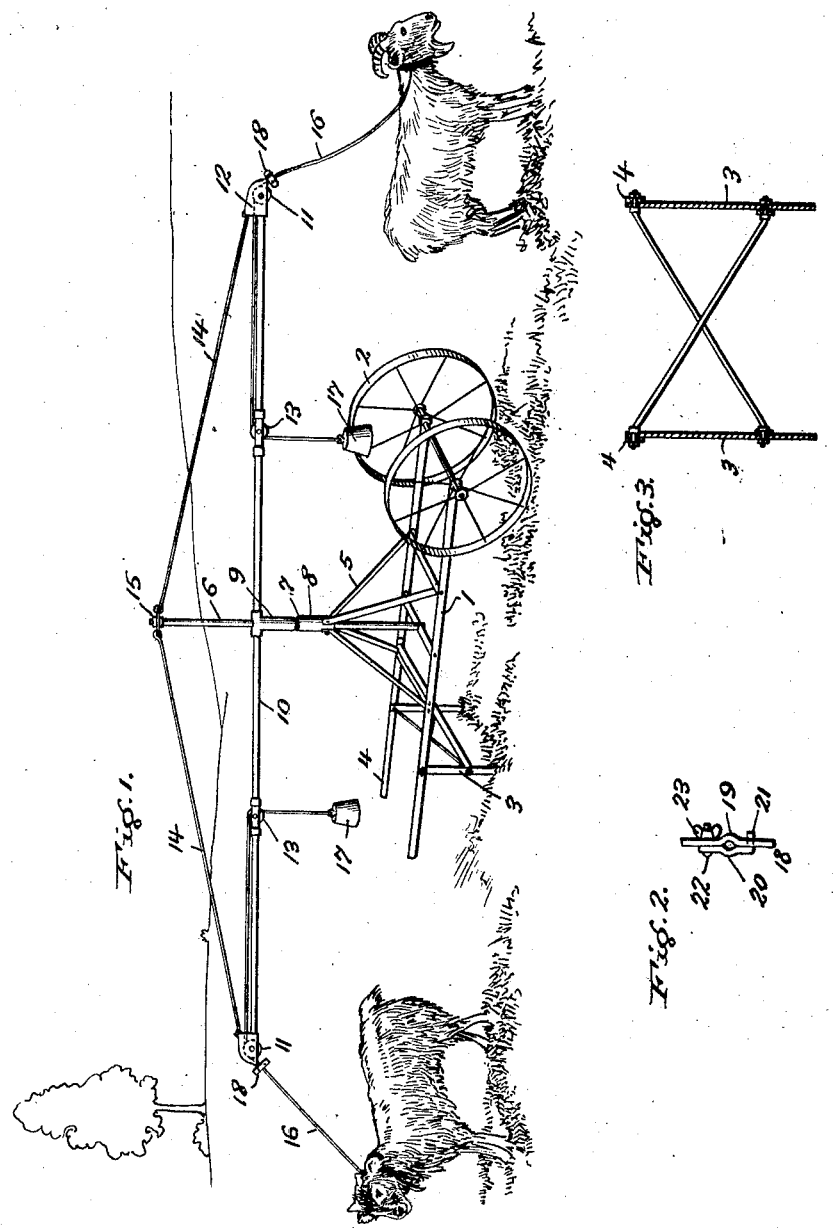
Andrew Hallum
INVENTOR
WITNESS:
ATTORNEY Patented June 1, 1926.

1,587,379

UNITED STATES PATENT OFFICE.

ANDREW HALLUM, OF WHALAM, MINNESOTA.

TETHER.

Application filed August 11, 1924. Serial No. 731,462.

My present invention pertains to tethers or animal grazing devices, and has for its object to provide a simple and efficient tether of portable type so that the tether can be expeditiously and easily moved from one point to another of a field, orchard or the like.

Other objects and practical advantages of the invention will be fully understood from the following description and claim when the same are read in connection with the drawings, accompanying and forming part of this specification, in which:—

Figure 1 is a perspective illustrating in use the preferred embodiment of my invention.

Figure 2 is a detail view illustrative of one of the stop members preferably employed on the cables of the tether and hereinafter referred to in detail.

Figure 3 is an enlarged detail cross-section of the wheeled frame showing the preferred diagonal and crossed embraces for lending increased strength to the legs of said frame.

Similar numerals of reference designate corresponding parts in both views of the drawings.

Among other elements my novel tether comprises a frame 1 equipped with ground wheels 2 and legs 3 as well as with handles 4. Manifestly the said frame 1 may be conveniently moved from place to place in a field or other area for the tethering of animals at various points.

Superimposed on and fixed to the wheeled frame 4 is a frame 5 to which is fixed an upright shaft 6 which extends considerably above the frame 5 as illustrated.

Supported at 7 on the upwardly extending portion 8 of the frame 5 and revoluble about the shaft 6 is the central sleeve 9 of a horizontally swinging sweep 10. At its end the sweep 10 is equipped with sheaves 11 in housings 12, and at points between the sheaves 11 and the center of the sweep, the sweep is equipped with appropriately-mounted sheaves 13. The housings 12 serve for the connection of the outer ends of truss cables 14, the inner ends of which are connected to a member 15 supported on and revoluble about the shaft 6.

Passed over the sheaves 11 and 13 are cables 16 which are equipped at their inner ends with weights 17. At their outer ends the cables 16 are adapted for the hitching of goats, calves or other live stock. The weights 17 are intended to take up slack of the cables 16, and at this point I would have it understood that without departure from my invention the well known mechanical equivalents of weights, namely, retractile springs, may in the discretion of the manufacturer, be employed in lieu of weights.

In order to prevent the weights or other means for taking up slack from interfering with the comfort of the animals when the animals are standing or alined below the ends of the sweep I provide on the cables 16 stop devices or members 18 adapted to bring up against the housings 12 after the manner shown in Figure 1. Each of the said stop members is preferably made up of members 19 and 20 interlocked at 21, a bolt 22 and a nut 23. In the practical use of my novel device it will be manifest that even when animals are attached thereto, it may be quickly and easily moved from one point to another. It will also be observed that the device obviates the necessity of fencing a field and enables a farmer to pasture goats and sheep in an orchard without fear of the animals damaging fruit trees. The device is also particularly useful for securing goats and sheep when the same are employed for clearing stump and brush land.

While the sweep is shown as embodying but two arms it is manifest that within the purview of my invention the sweep may have as many arms as is desirable.

I have specifically described the preferred embodiment of my invention in order to impart an exact understanding of the said embodiment. I do not desire, however, to be understood as confining myself to the said specific construction, the scope of my invention being defined by my appended claim within which changes may be made without departure from my invention.

Having described my invention, what I claim and desire to secure by Letters-Patent, is:—

A tether of the character described comprising a wheel supported braced frame, handles formed thereon, an overhanging revolvable sweep carried by said frame, cables guided on the opposite ends of said sweep and adapted to be attached to animals to be tethered, means for taking up the slack of said cables, a stop for each of said cables and being operatively associated with the ends of said sweep, and said stop including sections having one of their ends interlocked and a bolt extending through the opposite ends of said sections and a nut on the bolt for clamping the stop to the respective cable. for clamping the stop to its respective cable.

In testimony whereof I affix my signature.

ANDREW HALLUM.